(12) United States Patent
LaDouceur

(10) Patent No.: US 10,560,768 B2
(45) Date of Patent: Feb. 11, 2020

(54) SOUND RECEPTACLE

(71) Applicant: Just Funky LLC, Richfield, OH (US)

(72) Inventor: Gertrude LaDouceur, Delaware, OH (US)

(73) Assignee: JUST FUNKY LLC, Richfield, OH (US)

( * ) Notice: Subject to any disclaimer, the term of this patent is extended or adjusted under 35 U.S.C. 154(b) by 0 days.

(21) Appl. No.: 15/686,733

(22) Filed: Aug. 25, 2017

(65) Prior Publication Data
US 2019/0069059 A1 Feb. 28, 2019

(51) Int. Cl.
| | | |
|---|---|---|
| H04R 1/02 | (2006.01) | |
| B65D 25/02 | (2006.01) | |
| B65F 1/14 | (2006.01) | |
| H04R 1/44 | (2006.01) | |
| H04R 3/00 | (2006.01) | |

(52) U.S. Cl.
CPC ............ *H04R 1/028* (2013.01); *B65D 25/02* (2013.01); *B65F 1/14* (2013.01); *H04R 1/44* (2013.01); *B65F 2210/16* (2013.01); *H04R 3/00* (2013.01)

(58) Field of Classification Search
CPC ........ A47G 2019/2244; A47G 19/2227; A47G 2019/2238
See application file for complete search history.

(56) References Cited

U.S. PATENT DOCUMENTS

| | | | | |
|---|---|---|---|---|
| 5,990,790 | A * | 11/1999 | Lusareta | A47G 23/0306 206/459.1 |
| 8,344,902 | B2 * | 1/2013 | Chen | A47G 19/2227 340/384.73 |
| 8,373,574 | B2 * | 2/2013 | Gebhard | G06Q 99/00 220/4.21 |
| 2009/0114554 | A1 * | 5/2009 | Earnest | A47G 19/2227 206/217 |
| 2015/0329243 | A1 * | 11/2015 | Roth | B65D 81/365 206/216 |

* cited by examiner

*Primary Examiner* — Shawn M Braden
(74) *Attorney, Agent, or Firm* — Amin, Turocy & Watson, LLP

(57) ABSTRACT

Articles of manufacture, systems and methods facilitating sound diode receptacles are provided herein. In one embodiment, an article of manufacture comprises: an inner wall; an outer wall, wherein the inner wall and the outer wall form a double walled receptacle; a speaker device located in an inner region of the receptacle; and a control device having circuitry disposed in an inner region of the receptacle and configured to generate an output of sound that is emitted from the speaker device.

16 Claims, 13 Drawing Sheets

SOUND RECEPTACLE

TECHNICAL FIELD

The subject disclosure relates generally to receptacles and, for example, to systems, apparatus and methods facilitating sound receptacles.

DETAILED DESCRIPTION

Figure 1A:
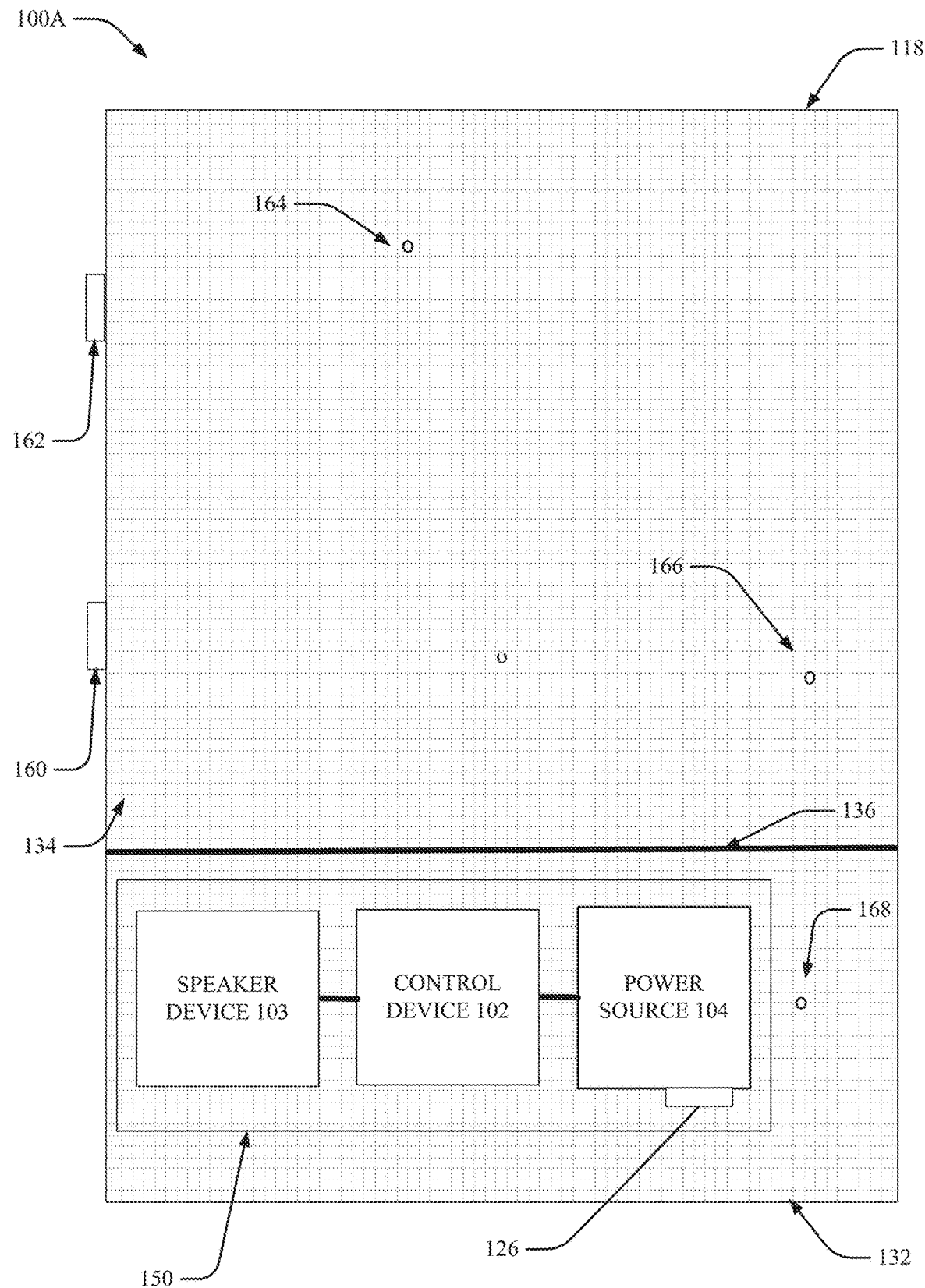
FIGS. 1A, 1B and 1C illustrate example, non-limiting partial views of schematic diagrams of sound receptacles (SRs) in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a circuitry-related entity, an entity powered by one or more power sources, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, an integrated circuit, one or more circuit components, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer, control unit, power source or one or more speaker devices to implement the disclosed subject matter. The term "article of manufacture" as used herein is intended to encompass, but is not limited to, a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "device," "component," "system," "communication device," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

One or more embodiments described herein comprise an article of manufacture (AOM). The AOM can comprise: an inner wall; an outer wall, wherein the inner wall and the outer wall form a double walled receptacle; a speaker device located in an inner region of the receptacle; and a control device having circuitry disposed in an inner region of the receptacle and configured to generate an output of sound that is emitted from the speaker device. In some embodiments, the outer wall comprises one or more apertures for the emission of the sound from the receptacle.

In some embodiments, the sound comprises a song and wherein the circuitry is configured to select a song of a plurality of songs to be emitted from the speaker device. The sound can comprise a song and wherein the song is one of a plurality of songs that are accessible by the control device to be emitted from the speaker device.

In some embodiments, the AOM further comprises a power source coupled to the control device and configured to provide power to the control device and the speaker device, wherein the power source is removably coupled to the control device and the speaker device, and wherein the power source comprises at least one battery. The at least one battery can be coupled to a switch that controls the at least one battery to provide power to the control device and to the speaker device. In some embodiments, the switch is electrically coupled to the at least one battery and is located on an exterior portion of the receptacle.

In some embodiments, the AOM further comprises a power connection component coupled to the control device, wherein the power connection component is configured to be removably coupled to a power source external to the article of manufacture to provide power to the control device and the speaker device. In some embodiments, the AOM can further comprise a seal located around a periphery of an interior region of the removable portion.

In some embodiments, the speaker device is a waterproof speaker device. The speaker device can be waterproof or, in some embodiments, a waterproof cover or waterproof container e.g., such as that made of plastic or other waterproof material, can be provided within the removable portion and can contain the speaker device (or serve as a barrier to reducing the likelihood or preventing water or liquid from coming into contact with the speaker device).

In some embodiments, the control device comprises a power shut off component configured to automatically shut off power from the at least one battery, and wherein the power shut off component is further configured to automatically shut off power from the at least one battery after a defined amount of time that the at least one battery has provided power to the control device or the speaker device.

In various embodiments, the AOM can comprise a cup, a basket or a waste container. In some embodiments, the AOM comprises second speaker device, wherein the second speaker device is also located in the inner region of the receptacle and is configured to emit the sound.

In some embodiments, the AOM further comprises a removable portion of the receptacle, wherein the control device and the at least one battery are located in the removable portion of the receptacle. The removable portion can further comprise the speaker device.

One or more other embodiments can comprise a method of operation. The method can comprise: generating, by a control device comprising a processor, an audio signal; and controlling, by the control device, provisioning of power to speaker device positioned on or within a receptacle having an inner wall and an outer wall, wherein provisioning of the power causes the speaker device to output sound associated with the audio signal, wherein the receptacle comprises a drinking vessel.

In some embodiments, the song comprises a song of a plurality of songs or a ringtone of a plurality of ringtones. In some embodiments, the method further comprises: controlling, by the control device, a mode of operation of the receptacle of modes of operation of the receptacle, wherein the modes of operation comprise a first mode of selecting the song at random, a second mode of selecting each of the plurality of songs in a defined order and a third mode of selecting a next song in order after a previous one of the plurality of songs has played.

In some embodiments, the method further comprises generating, by the control device, a signal to cause the at least one battery to cease providing power to the speaker device after a defined amount of time since commencement of providing power by the at least one battery.

In some embodiments, a system is provided. The system can comprise: a receptacle having one or more speaker devices configured to emit sound and disposed on or within the receptacle; and a power source coupled to one or more electrical connections respectively coupled to the one or more speaker devices to provide power to the one or more speaker devices, wherein the power source is configured to cause the one or more of the speaker devices to emit sound indicative of a song or a ringtone from the receptacle. In some embodiments, the receptacle can also include one or more illumination elements (light emitting diodes or other light bulbs) positioned in a bottom region of the receptacle that can become illuminated from time to time. In some embodiments, the illumination elements can become illuminated at designated times corresponding to portions of the songs playing or based on defined events.

Accordingly, one or more embodiments can provide a double walled receptacle (e.g., cup, basket, mug) with integrated circuit/chip (e.g., audio chip or other circuitry configured to generate, amplify or otherwise produce sound or enable sound to be emitted from a speaker device coupled to the integrated circuit/chi). In some embodiments, the circuitry and/or chip can be a sound chip in the removable region of the receptacle and that provides sound.

In different embodiments, different sounds/songs, ringtones, tunes can be played. For example, a defined number of sounds/songs can be played via the receptacle. The audio chip and/or corresponding circuitry to generate, process sound and/or cause the sound to be emitted from the speaker device can be positioned in a removable portion of the receptacle to facilitate washing the receptacle.

In some embodiments, a sound card or other storage device can be added to the receptacle and/or electronic information indicative of one or more sound (e.g., audio files) can be added to or accessed by (over the Internet by or from a storage location at) the receptacle to update the sounds that can be played from the receptacle.

In some embodiments, the speaker device can be configured with circuitry to enable different volumes of the sounds to be emitted. For example, the receptacle can include a knob, toggle button or other volume control element enabling the user of the receptacle to adjust the volume of the sound emitted from the speaker device.

Figure 1B:
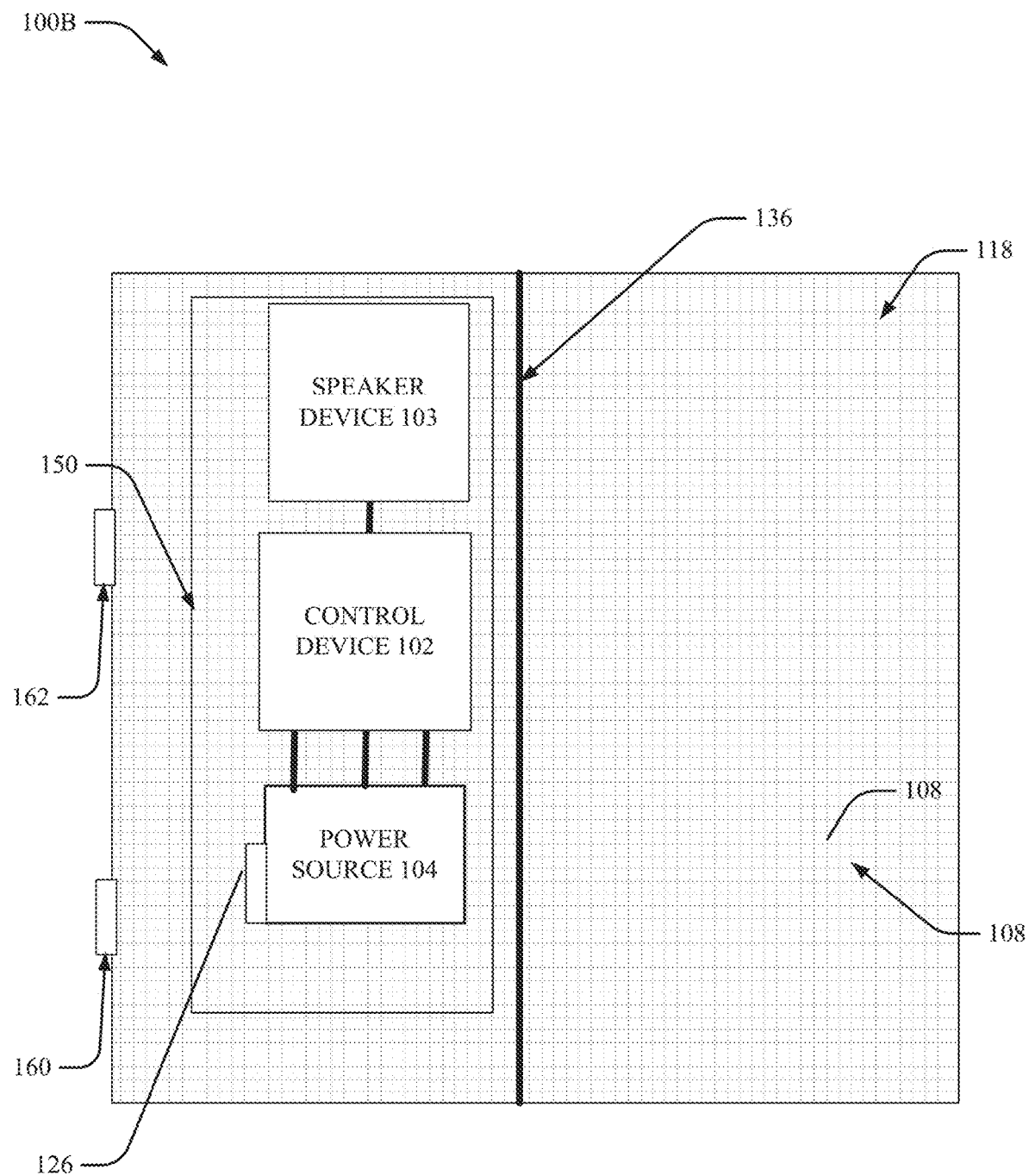
Figure 1C:
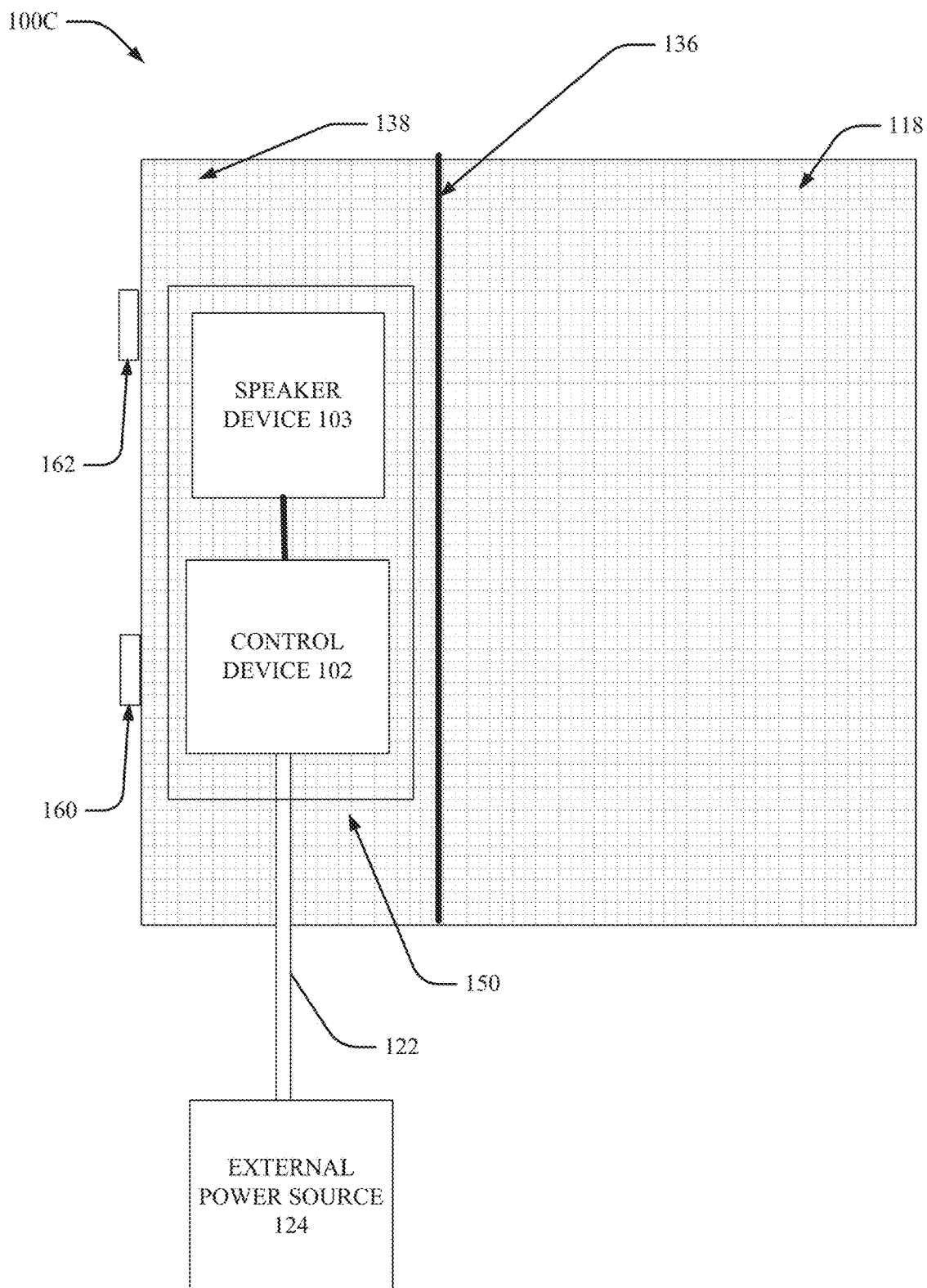

FIGS. 1A, 1B, and 1C illustrate example, non-limiting partial views of schematic diagrams of SRs (e.g., 100A, 100B, 100C, 200A) in accordance with one or more embodiments described herein. Repetitive description of like elements employed in other embodiments described herein is omitted for sake of brevity.

With reference to FIGS. 1A, 1B and 1C, the partial views of the SRs 100A, 100B, 100C, 200A can be a view showing various components of the SRs 100A, 100B, 100C, 200A including control device 102, power source 104 and/or one or more speaker devices 106, 108, 110. As shown, the control device 102, power source 104 and/or one or more speaker devices 106, 108, 110 can be electrically and/or communicatively coupled to one another to perform one or more functions of the SRs 100A, 100B, 100C, 200A.

In various embodiments, control device 102 can be wired or connected wirelessly to one or more other devices at the SR 100A or otherwise. In some embodiments, the control device 102 can include an antenna while one or more of the speaker device 103 can include receivers (not shown) that can receive a wireless signal transmitted via a transmitter (not shown) of or controlled by the control device 102 and emit sound from the receptacle. In some embodiments, the outer wall can include one or more apertures 164, 166 to facilitate emission of the sound from the receptacle.

In embodiments, the control device can include circuitry and/or an integrated circuit (e.g., sound chip) that can generate one or more sounds that will be emitted from one or more of the speaker devices (e.g., shown is a single speaker device 103 but, in other embodiments, any number of speaker devices can be included in the SRs 100A, 100B, 100C, 200A).

In some embodiments, the speaker device 103 can be or include circuitry or any other component configured to emit sound upon receipt of power. Any number of different technologies for audio processing can be employed to emit sound from the SRs 100A, 100B, 100C, 200A and are envisaged within the scope of this disclosure.

The power source 104 can be removable from the SRs 100A, 100B in some embodiments to allow the SRs 100A, 100B to be washed and/or cleaned. For example, in some embodiments, the power source 104 can be plugged/unplugged into the control device 102 and/or the SR 100A, 100B, 100C, 200A in general. In some embodiments, the power source 104 can include a switch 126 that can allow the power source 104 to be manually turned on or off (e.g., by a human, for example).

In some embodiments, one or more of SRs 100A, 100B, 100C, 200A can include a switch 160 that can be triggered to control a mode of operation of the SRs 100A, 100B, 100C, 200A. While the switch is shown on SR 100A, in various embodiments, it can be included on or within one or more of SRs 100A, 100B, 100C, 200A. The switch 160 can be coupled to the control device 102 and can control whether the control device causes the SRs 100A, 100B, 100C, 200A to operate in one or more different modes. The switch 160 can be electrically coupled (wirelessly or wired) to the control device 102 in various embodiments.

In some embodiments, the switch 160 can control whether there is operation in one mode or another. As an example, depressing the switch 160 (or initiating another control device) can cause the control device 102 to operate in one or modes. For example, a mode of operation of the receptacle can comprise a first mode of selecting a song at random, a second mode of selecting each of a plurality of songs in a defined order and/or a third mode of selecting a next song in order after a previous one of the plurality of songs has played. Any number of modes are possible.

In some embodiments, one or more of the SRs 100A, 100B, 100C, 200A can access an audio file comprising at least a second sound. For example can be associated with a single song or with a group of songs for one or more different artists. The SRs 100A, 100B, 100C, 200A can generate an audio signal associated with the second sound, and cause the speaker device (e.g., speaker device 103) to output the second sound. In some embodiments, accessing the audio file is performed from a storage device of the receptacle or via the Internet (over an electrical connection (not shown) and/or over a wireless connection). In this regard, numerous new and different songs can be stored on the SRs 100A, 100B, 100C, 200A and/or accessed by the SRs 100A, 100B, 100C, 200A to be played by the SRs 100A, 100B, 100C, 200A from time to time. The user of the SRs 100A, 100B, 100C, 200A can therefore determine which songs are of interest and cause the SRs 100A, 100B, 100C, 200A to play such songs and/or to operate in one or more different modes.

In some embodiments, volume control element 162 can also be included in SRs 100A, 100B, 100C, 200A such that the user of the SRs 100A, 100B, 100C, 200A can toggle, depress or otherwise control the volume control element 162 to cause the SRs 100A, 100B, 100C, 200A to emit one or more sounds at a lower or higher volume. In different embodiments, the volume control element 162 can be or include a switch, a knob, a depressable button, a volume slider or the like.

In some embodiments, although not shown, the SRs 100A, 100B, 100C, 200A can include one or more transceivers that can transmit a request for an audio file and/or receive an audio file. For example, the control device 102 can be configured to control request and/or control receipt of information associated with downloading, storing or otherwise accessing audio files.

In some embodiments, the control device 102 can control the output of sound (e.g., songs, including words as well as music only variations of songs, or ringtones). In some embodiments, the control device 102 can control the output of sound according to one or more modes of operation as described above.

With regard to the power source 104, in various embodiments, the power source 104 can include at least one battery (e.g., one or more batteries or a battery pack) in various embodiments. In other embodiments, the power source 104 can be other sources of power, including, but not limited to, solar cells charged by removing the power source 104 from the SR 100A, 100B and providing allowing sunlight to be applied to the solar cells. All such embodiments are envisaged.

Further, in some embodiments, such as SR 100C, the control device 102 can be coupled to an electrical connection 122 (e.g., electrical cord) configured to enable the control device to receive power from an external power source 124 (e.g., an electrical outlet, one or more batteries or the like). As shown, in some embodiments, the SR 100A can include a removable portion 132 that can be detached by any number of approaches and can include the control device 102 and/or the power source 104. For example, the removable portion can be sized to be telescopically attached to the bottom portion 134 of the receptacle 100. As another example, the removable portion can be configured with ridges that can enable the removable portion 132 to be screwed onto the bottom portion 134 of the receptacle 100. In some embodiments, such as that shown in FIG. 1A, the removable portion is at the bottom portion 134 of the receptacle; however, in other embodiments, the removable portion is at the side portion 138 of the SR 100C such as that shown in FIG. 3C.

Figure 2A:
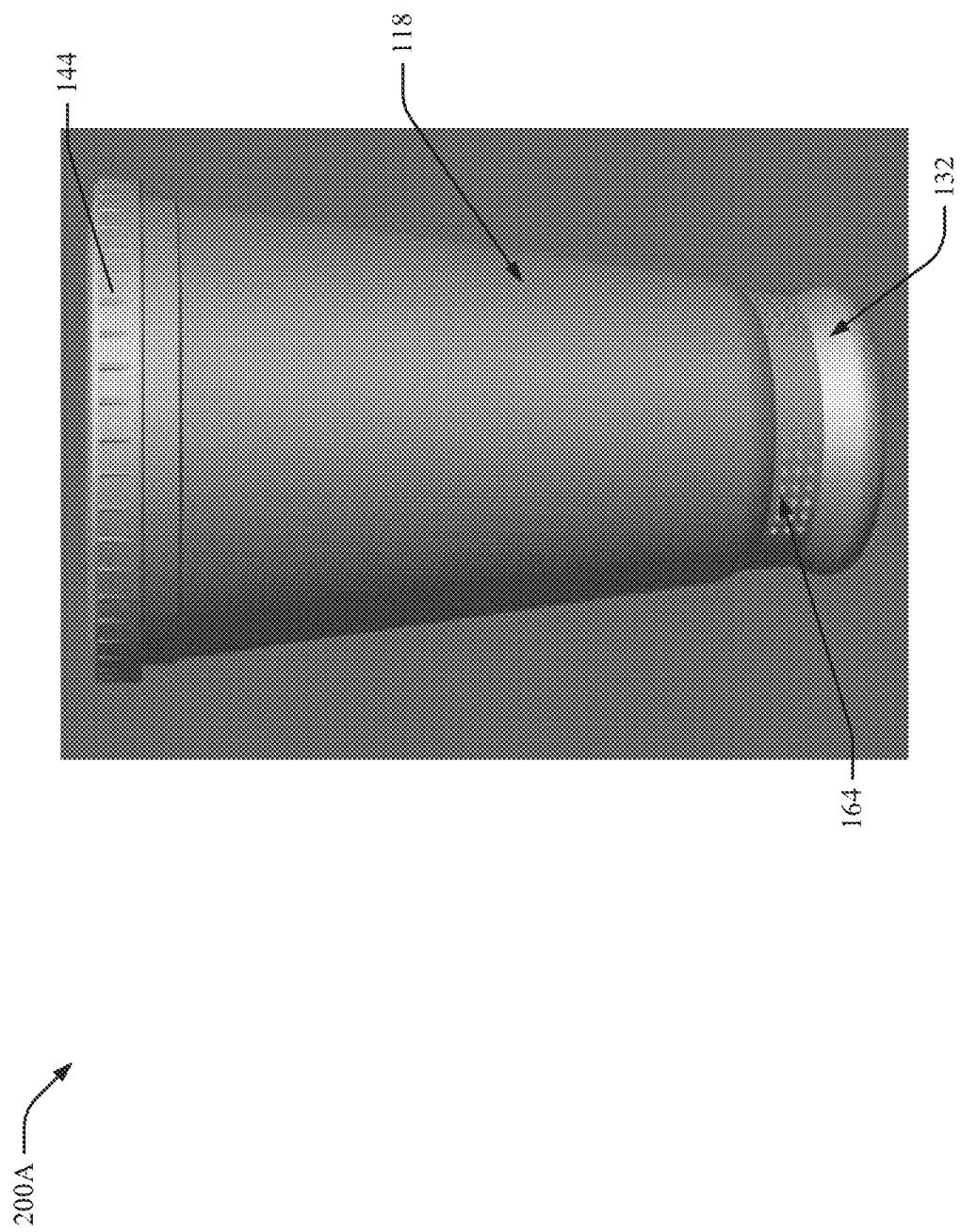
FIGS. 2A and 2B illustrate example, non-limiting photographs of an SR and a removed bottom portion, respectively, of the SR in accordance with one or more embodiments described herein.

In some embodiments, the inner ridge of the SRs 100A, 100B, 100C, 200A can include a seal 136 that can prevent or reduce the likelihood of water entry into the removable portion. In some embodiments, the seal 136 can be a silicon ring, a rubber ring or any other ring or material that is substantially waterproof. In some embodiments, the speaker device 103 in the removable portion can be a waterproof speaker device. The speaker device 103 can be waterproof or, in some embodiments, a waterproof cover 202 or waterproof container e.g., such as that made of plastic or other waterproof material, can be provided within the removable portion and can contain the speaker device (or serve as a barrier to reducing the likelihood or preventing water or liquid from coming into contact with the speaker device 103). As shown in FIG. 2E, the speaker device 103 under cover 202 can be waterproof.

Shown in FIGS. 1A, 1B and 1C are side views, and from this view, the control device 102, power source 104 and/or one or more speaker device 103 can be disposed within an inner region of the SRs 100A, 100B, 100C, 200A. In some embodiments, the speaker device 103 are disposed on or within an inner region of the SRs 100A, 100B, 100C, 200A. In some embodiments, the outer wall 118 of the SR 100A, 100B, 100C, 200A and can be any suitable material for a receptacle including, but not limited to, plastic, aluminum, porcelain, ceramic or the like.

In some embodiments, the outer wall 118 can be transparent or translucent. The speaker device 103 can be provided at particular locations in the removable portion 132 of SRs 100A, 100B, 100C, 200A and/or on or within the outer wall 118 or an inner wall that forms the double walled structure of the SRs 100A, 100B, 100C, 200A with the outer wall 118. The speaker device 103 can be adhered or mechanically coupled to any inner surface of the SRs 100A, 100B, 100C, 200A, 200B. All such embodiments are envisaged. The partial view shows the SRs 100A, 100B, 100C, 200A open with the inner wall (not shown) removed.

Accordingly, in some embodiments, the SR 100A can be a double walled plastic receptacle with speaker device 103 (and in some embodiments, electrical connections 110, 112, 114) inside of the receptacle. The photos of FIGS. 2A, 2C and 2D are 3$d$ printed prototype. In production the outer wall 118 can be clear in some embodiments as shown in FIGS. 2C and 2D to enable an illumination element to be visible in lighting the SRs 100A, 100B, 100C, 200A in some embodiments. The battery, etc. can be in a removable section 132 of the SRs 100A, 100B, 100C, 200A. The removable section 132 can seal with a silicon ring so the SRs 100A, 100B, 100C, 200A are hand washable.

With reference to FIGS. 2C and 2D, as noted above, in some embodiments, the SRs 100A, 100B, 100C, 200A can also include one or more illumination elements (light emitting diodes or other light bulbs) (not shown) positioned in a bottom region of the SRs 100A, 100B, 100C, 200A that can become illuminated from time to time (FIG. 2C shows the SR without illumination and FIG. 2D shows the same SR with illumination from illumination element). In some embodiments, the illumination elements can become illuminated at designated times corresponding to portions of the songs playing by the SR or based on defined events.

Accordingly, one or more embodiments can provide a double walled receptacle (e.g., cup, basket, mug) with integrated circuit/chip (e.g., audio chip or other circuitry configured to generate, amplify or otherwise produce sound or enable sound to be emitted from a speaker device coupled to the integrated circuit/chi). In some embodiments, the circuitry and/or chip can be a sound chip in the removable region of the receptacle and that provides sound.

As shown in the embodiments of FIGS. 2C and 2D, in some embodiments, the SR (e.g., SR 200B) can include a cover 144 that includes an aperture to receive and maintain a straw 204 for extracting liquid from the SR 200B. As such, the SR 200B can also include a straw 204 in some embodiments.

Figure 3A:
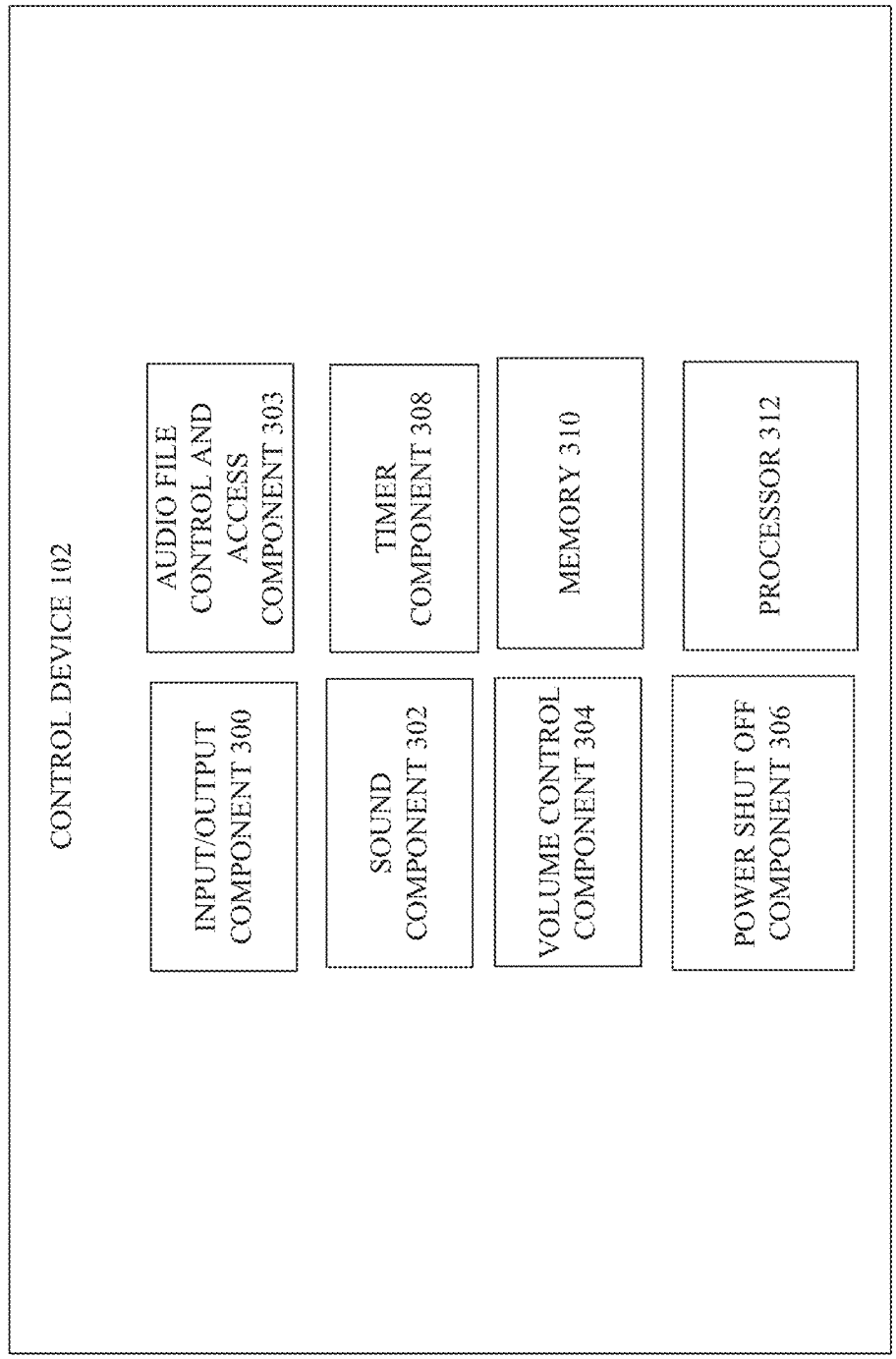
FIGS. 3A and 3B illustrate example, non-limiting block diagrams of a control device of an SR in accordance with one or more embodiments described herein.
Figure 3B:
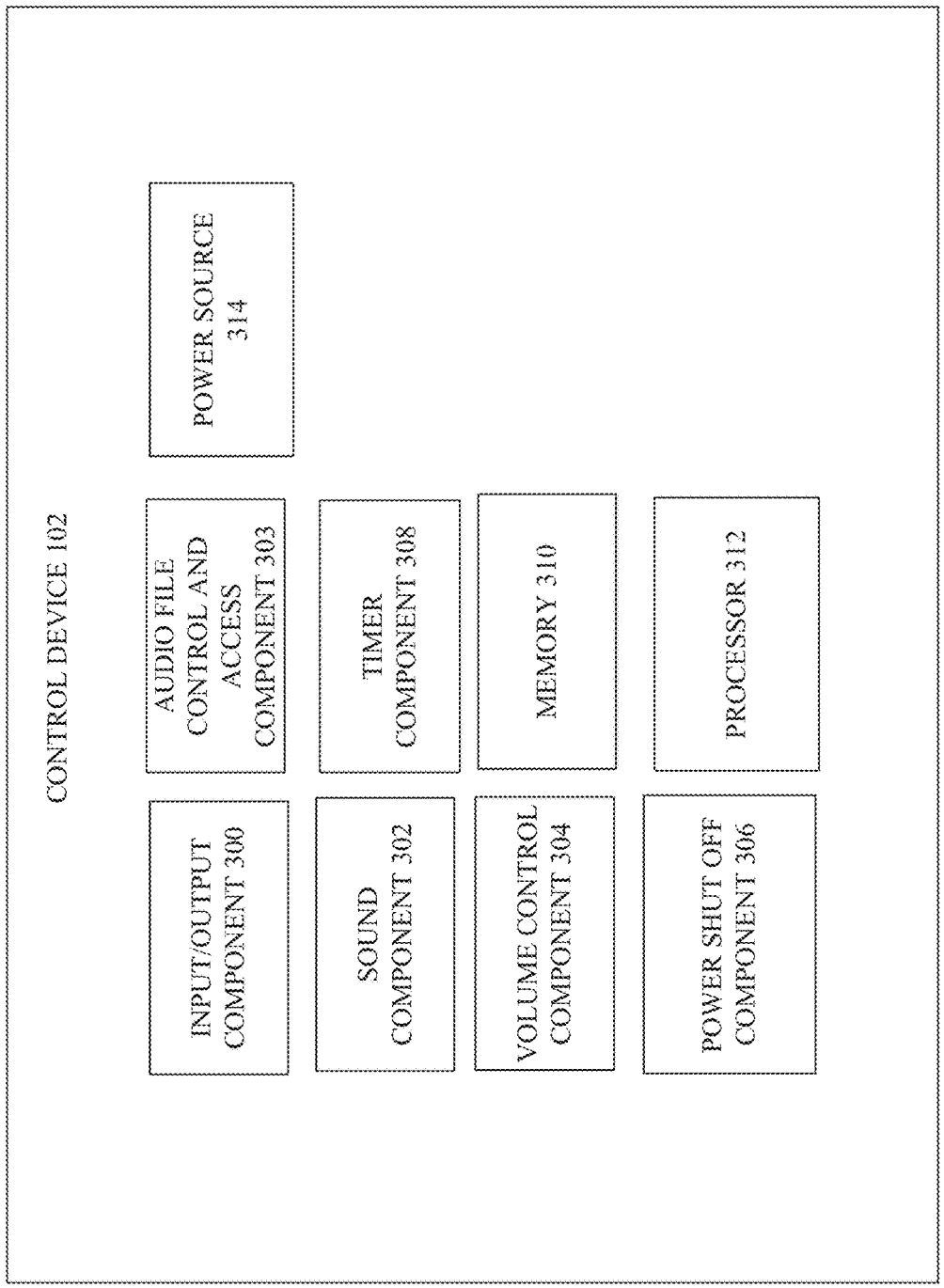

As shown in FIGS. 1A, 1B, 1C, there can be numerous different approaches to connecting the power source 104, control device 102 and/or one or more speaker device 103 to control playing of sounds from the SR 100A, 100B, 100C, 200A. These approaches will be described in more detail with reference to the control device of FIGS. 3A and 3B. FIGS. 3A and 3B illustrate example, non-limiting block diagrams of a control device of an SR in accordance with one or more embodiments described herein. In some embodiments, the control device 102 can be or can include an integrated circuit/chip to perform one or more of the functions of the control device 102.

As shown in FIG. 3A, control device 102 can comprise an input/output (I/O) component 300 configured to output one or more signals to the power source 104 for control of the power source (and/or control of sound from the speaker device 103 via the power source 104). In some embodiments, the I/O component 300 can receive one or more signals from the power source 104. In some embodiments, the I/O component 300 can include a power supply cable to power the control device.

The I/O component 300 can also transmit and/or receive signals configured to control the volume of the sounds emitted from the SRs 100A, 100B, 100C, 100D, 200A, 200B, the mode of operation of the SRs 100A, 100B, 100C, 100D, 200A, 200B, transmission of requests for one or more audio files and/or receipt of one or more audio files or the like.

The control device 102 can also include a sound component 302, audio file control and access component 303 and/or a volume control component 304. The sound component 302 can generate, process and/or control one or more signals causing sound to be emitted from the speaker devices. The volume control component 304 can control the volume of the sound being emitted. The audio file control and access component 303 can control request, receipt, processing and/or downloading or storage of new audio files.

The power shut off component 306 can control the power source 104 to power down. In some embodiments, the power shut off component 306 can control the power source to automatically (without human intervention) shut down after a defined amount of time that the power source 104 has been turned on. Accordingly, in some embodiments, the timer component 308 can track a time that the power source 104 has been turned on and generate a signal causing the control device 102 to output a signal for turning the power source 104 when a defined amount of time has passed that the power source 104 has been turned on.

As shown in FIG. 3B, in some embodiments, the control device 102 can comprise its own power source 314 enabling the control device 102 to power up or power down without separate power source 104. In some embodiments, the power source 104 can be the power source 314 and therefore can reside within the control device 102.

With reference to FIGS. 3A and 3B, the memory 310 can comprise computer-executable instructions that can be executed by the processor 312. For example, the computer executable instructions can include different modes of operation or information for selecting modes of operation, that can provide instructions to light the SR at defined times or upon detection of defined conditions, processing of new sounds received and/or accessed, storage of one or more audio files or the like.

With reference to FIGS. 1A, 3A, 3B, the control device 102 and the speaker device 103 are electrically connected to the power source 104 to receive power from the power source 104. Upon receiving power from the power source 104, the speaker device 103 can become activated. As shown, the electrical connection between the power source 104 and the speaker device 103 can be separate in some embodiments so as to enable the power source 104 to provide power to only one or more of several possible speaker devices (e.g., speaker device 103 and any other speaker devices, which are not currently shown) at any particular time. Accordingly, the electrical connection can be connected to a particular speaker device. For example, in some embodiments, the control device 102 can generate a signal that can be received by the power source 104 causing the power source 104 to turn on or off designated ones of the speaker device 103 (e.g., via the control device 102 and/or the sound component 300 or a speaker control component (not shown)).

Thus, in some embodiments, the power source 104 can provide power to all speaker device 103 to cause all speaker device 103 to emit sound concurrently while at other times, the sound may be emitted at only a subset of speaker device 103 based on power being provided from the power source 104 to that corresponding subset of speaker device 103.

In some embodiments, the power source 104 can provide power in a staggered manner to the speaker device 103 (and to one or more other speaker devices, which are not shown) or provide the speaker devices power in a particular pattern or order to cause the speaker device 103 to emit sound and then turn off (when power ceases to be provided to that particular one of the speaker device 103 by the power source 104). Accordingly, in different embodiments, different patterns of emitting sound between one or more speaker devices (e.g., speaker device 103 and any other speaker devices) over time can be performed via the SRs 100A, 100B, 100C, 200A.

With reference to FIGS. 1B, 3A, 3B, the control device 102 and the speaker device 103 are electrically connected to one another and the control device 102 is connected to the power source 104 to receive power from the power source 104 and to control emitting sound via one or more of the speaker devices (e.g., speaker device 103 and one or more other speaker devices). In various embodiments, other speaker devices can be included in the removable portion of the SRs 100A, 100B, 100C.

With reference to FIGS. 1C, 3A, 3B, the control device 102 and each of the one or more speaker devices are electrically connected to one another and the control device 102 is connected to the external power source 124 to receive power from the external power source 124 and to control emission of sound from one or more of the speaker device 103.

Figure 2B:
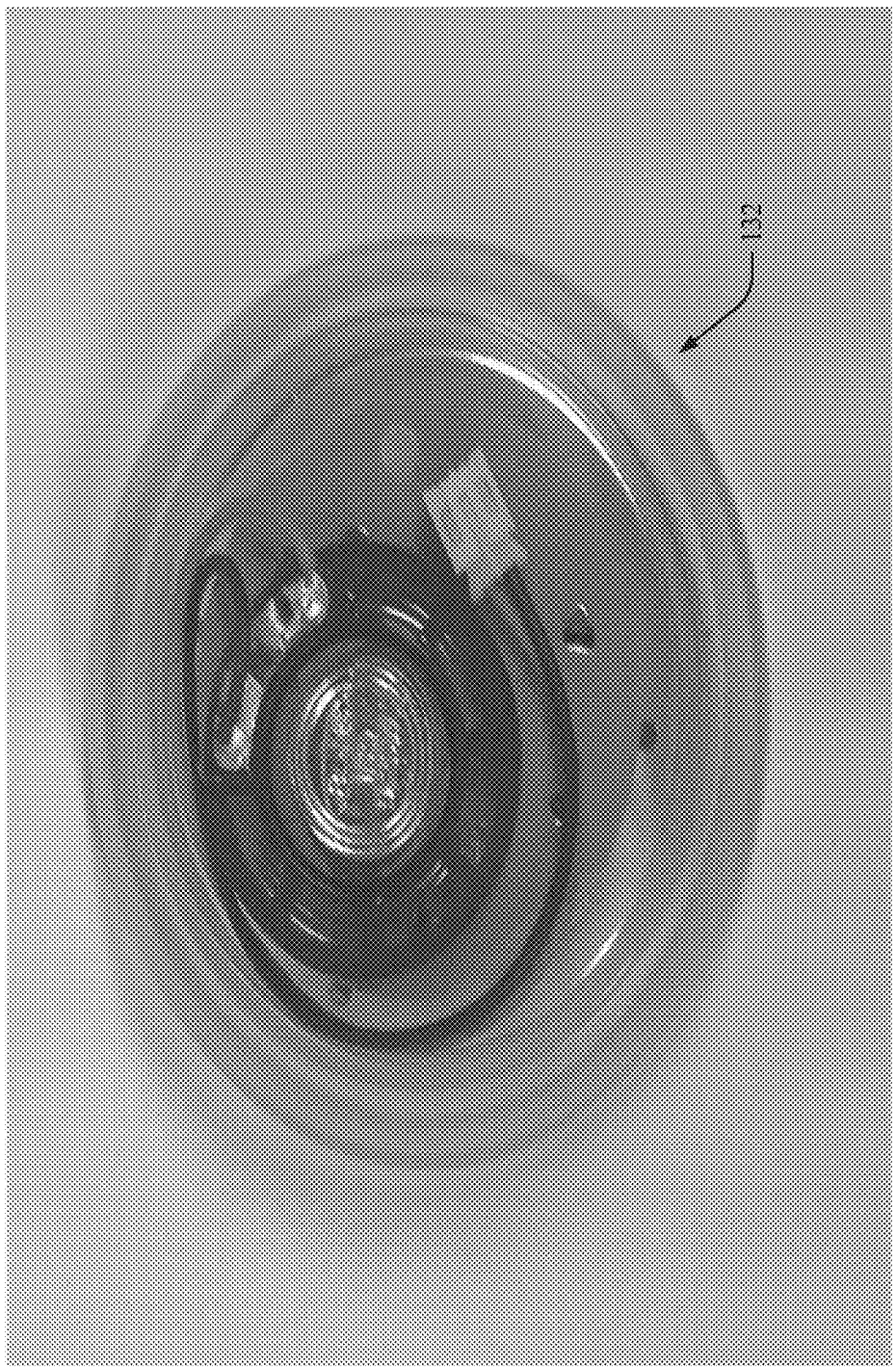
Figure 2C:
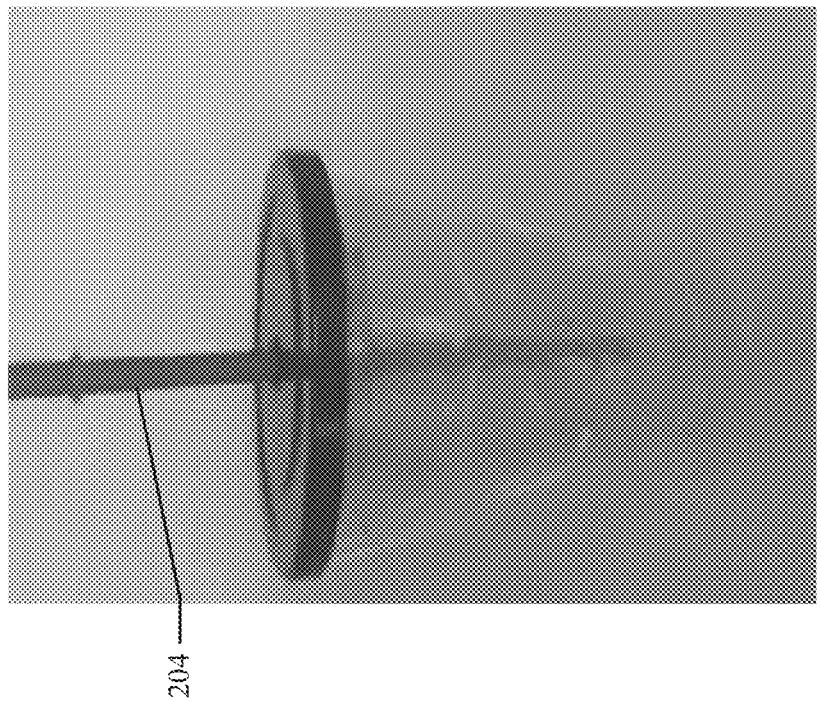
FIGS. 2C and 2D illustrate example, non-limiting photographs of another SR and a removed bottom portion, respectively, of the SR in accordance with one or more embodiments described herein.
Figure 2D:
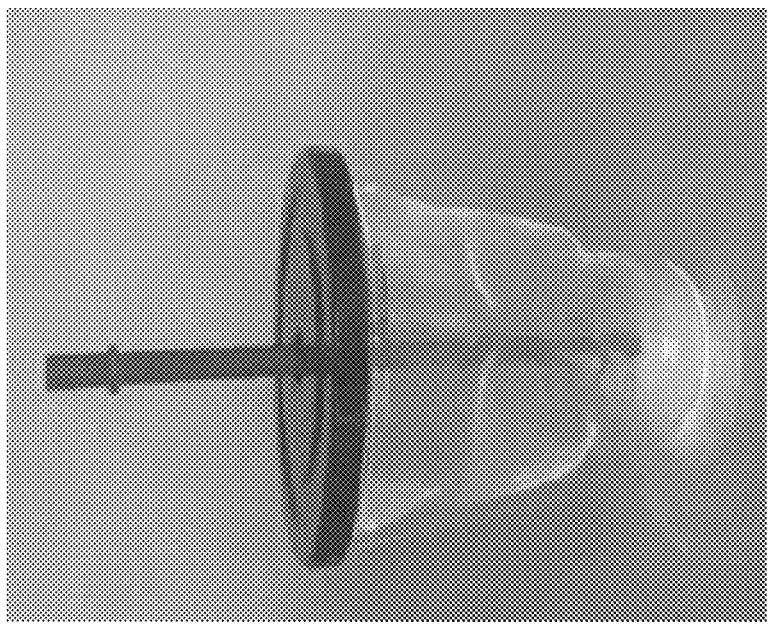
Figure 2E:
FIG. 2E illustrates an example, non-limiting photograph of a cover and speaker device in accordance with one or more embodiments described herein.

FIGS. 2A and 2B illustrate example, non-limiting photographs of an sound receptacle and a removed bottom portion of the sound receptacle in accordance with one or more embodiments described herein. Repetitive description of like elements employed in other embodiments described herein is omitted for sake of brevity.

With reference to FIGS. 2A, 2B, 2C and 2D, the SRs 200A, 200B have the electrical connections 112, 116 connected to the battery 104 in lieu of being directly connected to the control device 102. As such, in various different embodiments, the electrical connections can be connected directly to the control device 102 (as shown in FIGS. 1A, 1B and 1C), the battery 104 and/or the switch 126 for the battery 104. In some embodiments, the receptacle can be a cup or tumbler and/or a mug. The cup or tumbler can include a cover 144 or other top for reducing the likelihood of spillage of fluid located inside the cup or tumbler.

As shown in FIGS. 1A, 1B, 1C, 2B and 2E, inside of the removable portion can be circuitry 150. As used herein, the term "circuitry" can include in whole or in part, but is not limited to, power source 104, control device 102, one or more integrated circuits/chips that perform one or more functions, electrical connections 112, 114, 116, an electrical connector 122 and/or one or more speaker device 103. The speaker device 103 can be dispersed through or attached to (e.g., via adhesive, mechanically coupled, sewn or the like).

Although in embodiments described herein only various speaker devices are labeled (e.g., 103, 140, 142) in some embodiments, any number of speaker devices can be provided as part of the SR 100A, 100B, 100C, 200A, 100D, 100E, 200 and all such embodiments are envisaged.

Figure 4:
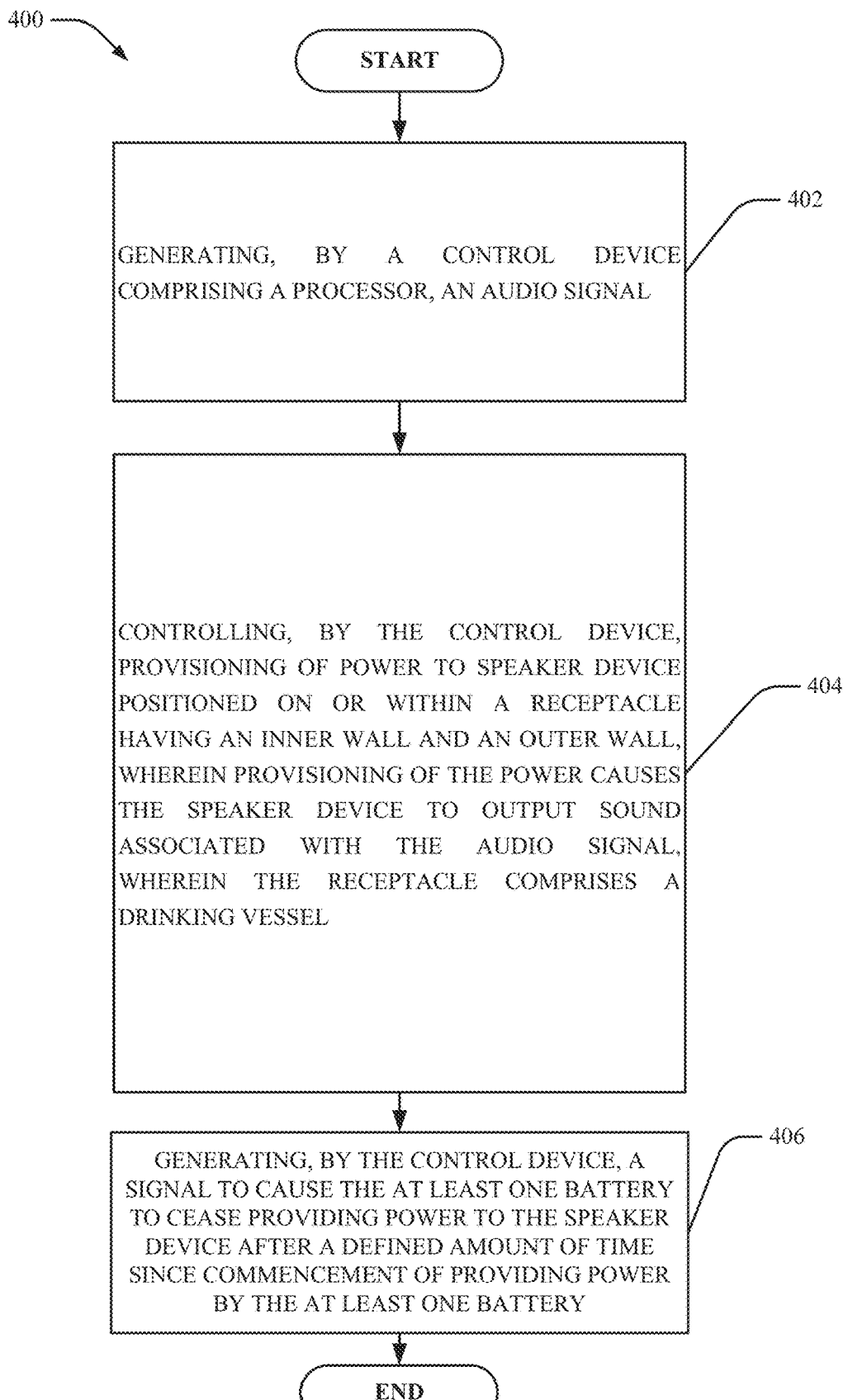
FIGS. 4 and 5 illustrate flow charts of methods of operation of an SR in accordance with one or more embodiments described herein.
Figure 5:
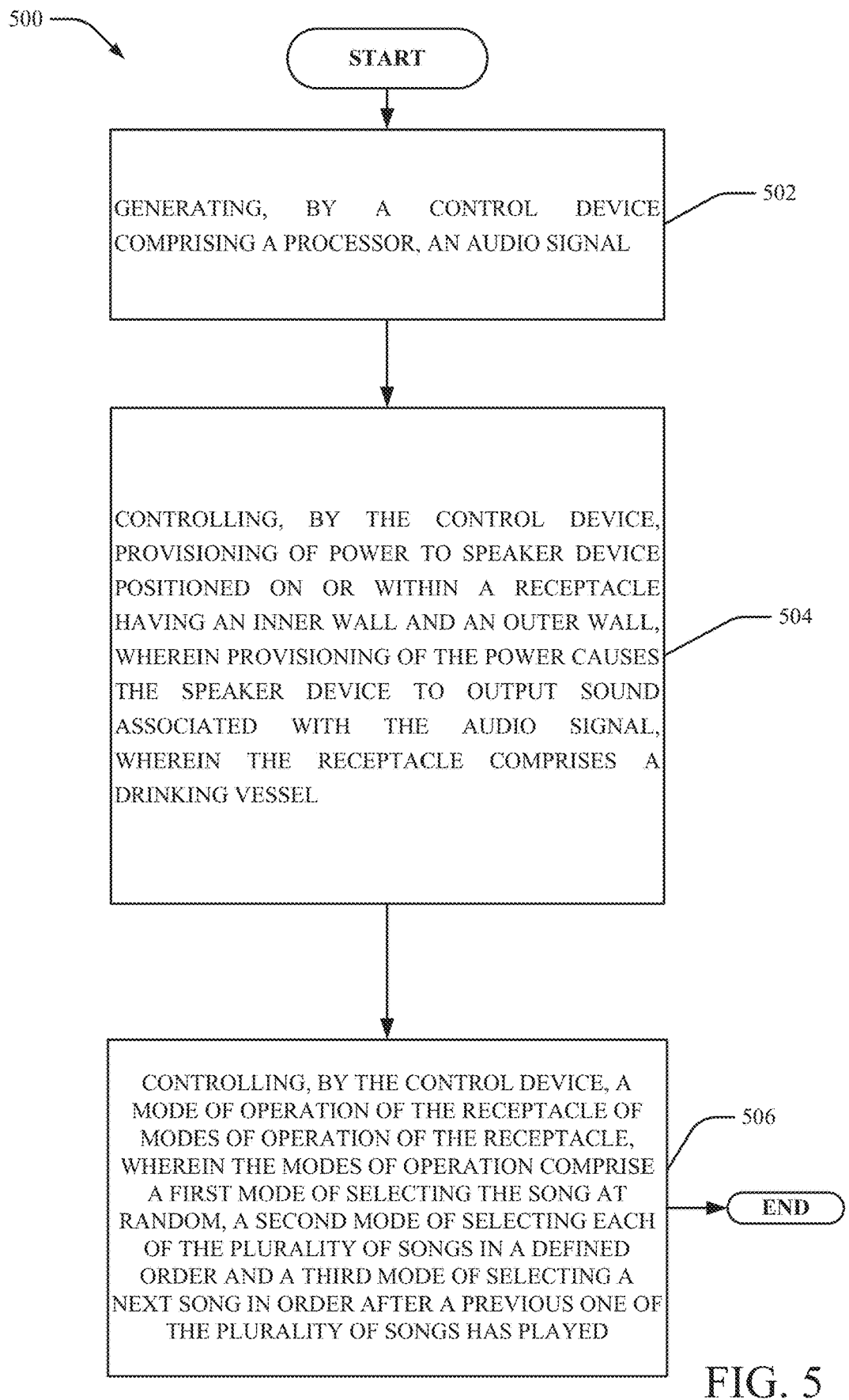

FIGS. 4 and 5 illustrate flow charts of methods of operation of an SR in accordance with one or more embodiments described herein. Repetitive description of like elements employed in other embodiments described herein is omitted for sake of brevity.

Turning first to FIG. 4, at 402, method 400 can comprise generating, by a control device comprising a processor, an audio signal. At 404, method 400 can comprise controlling, by the control device, provisioning of power to speaker device positioned on or within a receptacle having an inner wall and an outer wall, wherein provisioning of the power causes the speaker device to output sound associated with the audio signal, wherein the receptacle comprises a drinking vessel. At 406, method 400 can comprise generating, by the control device, a signal to cause the at least one battery to cease providing power to the speaker device after a defined amount of time since commencement of providing power by the at least one battery.

Turning now to FIG. 5, at 502, method 500 can comprise 402 of method 400. At 504, method 500 can comprise 404 of method 400. At 506, method 500 can comprise controlling, by the control device, a mode of operation of the receptacle of modes of operation of the receptacle, wherein the modes of operation comprise a first mode of selecting the song at random, a second mode of selecting each of the plurality of songs in a defined order and a third mode of selecting a next song in order after a previous one of the plurality of songs has played.

In some embodiments, the sound comprises at least one song of a plurality of songs or at least one ringtone of a plurality of ringtones.

Although not shown, another method of operation can comprise: generating, by a control device comprising a processor, an audio signal; and controlling, by the control device, provisioning of power to speaker device positioned on or within a receptacle having an inner wall and an outer wall, wherein provisioning of the power causes the speaker device to output a first sound associated with the audio signal, wherein the receptacle comprises a drinking vessel. In some embodiments, the method can also comprise: accessing, by the control device, an audio file comprising at least a second sound; generating, by the control device, a second audio signal associated with the second sound; and causing, by the control device, the speaker device to output the second sound, wherein the accessing the audio file is performed from a storage device of the receptacle or via the Internet.

Figure 6:
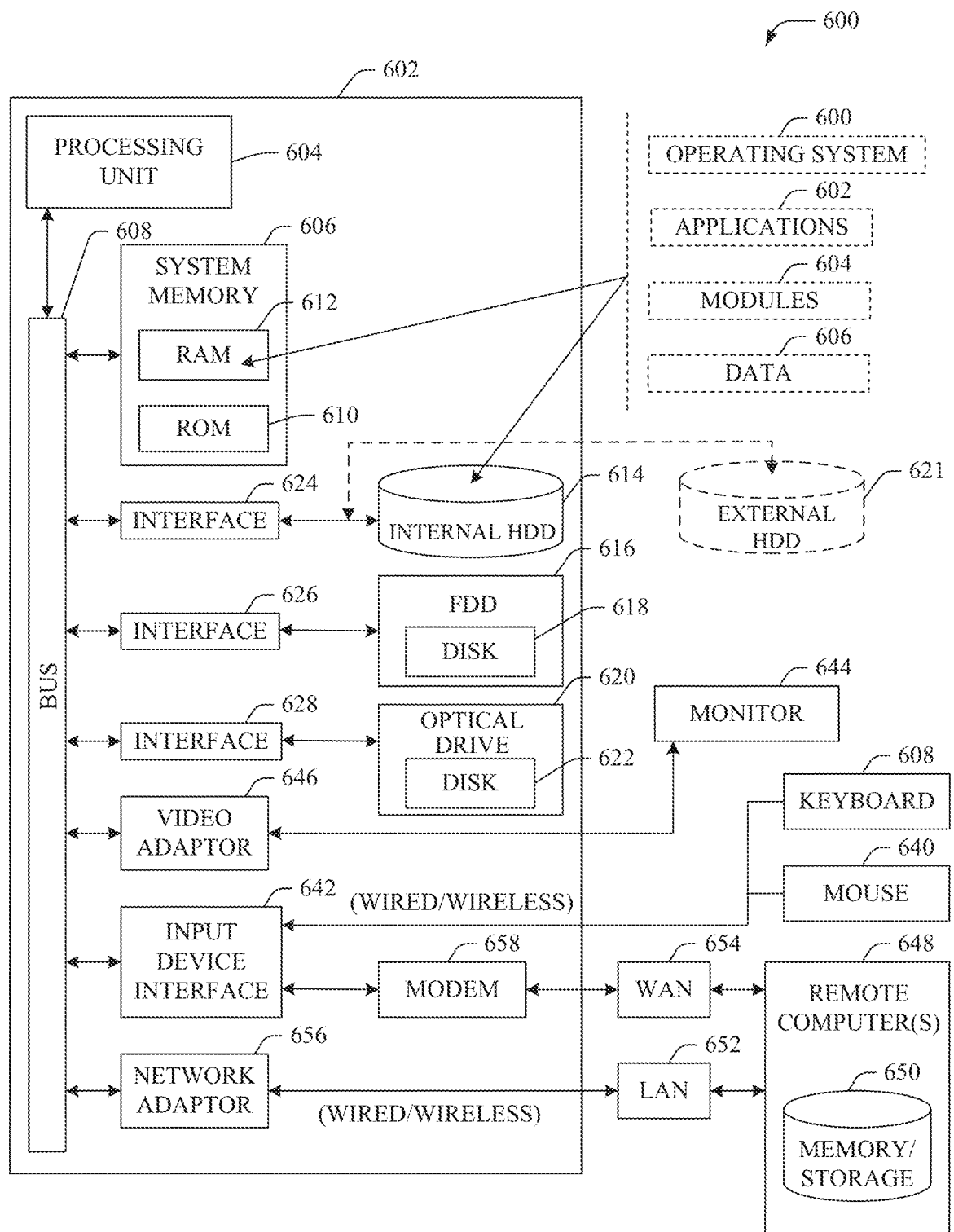
FIG. 6 illustrates a block diagram of a computer that can be employed in accordance with one or more embodiments described herein.

FIG. 6 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, SRs 100A, 100B, 100C, 200A, 100D, 100E, 200, control device 102, power source 104, speaker device 103 (or components of SR 100A, 100B, 100C, 200A, 100D, 100E, 200A, control device 102, power source 104, speaker device 103).

In order to provide additional text for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment 600 for implementing various embodiments of the embodiments described herein comprises a computer 602, the computer 602 comprising a processing unit 604, a system memory 606 and a system bus 608. The system bus 608 couples system components comprising, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 610 (e.g., EIDE, SATA), which internal hard disk drive 614 can also be configured for external use in a suitable chassis (not shown), a magnetic floppy disk drive 616, (e.g., to read from or write to a removable diskette 618)

and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 602, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A communication device can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.11 or Ethernet). Wi-Fi networks operate in the unlicensed 2.4 and 5 GHz radio bands, at an 10 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier (s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An article of manufacture, comprising:
an inner wall;
an outer wall, wherein the inner wall and the outer wall form a double walled receptacle; and
a removable portion of the double walled receptacle, wherein the removable portion affixes to a bottom of the double walled receptacle, wherein the removable portion comprises:
a speaker device,
at least one illuminating device, and
a control device having circuitry and configured to generate an output of sound that is emitted from the speaker device, and control illumination of the at least one illuminating device corresponding with a portion of a song being played as the output of sound.

2. The article of manufacture of claim 1, wherein the sound comprises a song and wherein the circuitry is configured to select a song of a plurality of songs to be emitted from the speaker device.

3. The article of manufacture of claim 1, wherein the sound comprises a song and wherein the song is one of a plurality of songs that are accessible by the control device to be emitted from the speaker device.

4. The article of manufacture of claim 1, wherein the outer wall comprises one or more apertures for the emission of the sound from the double walled receptacle.

5. The article of manufacture of claim 1, wherein the article of manufacture further comprises a power source coupled to the control device and configured to provide power to the control device and the speaker device, wherein the power source is removably coupled to the control device and the speaker device, and wherein the power source comprises at least one battery.

6. The article of manufacture of claim 5, wherein the at least one battery is coupled to a switch that controls the at least one battery to provide power to the control device and to the speaker device.

7. The article of manufacture of claim 6, wherein the switch is electrically coupled to the at least one battery and is located on an exterior portion of the double walled receptacle.

8. The article of manufacture of claim 1, further comprising a power connection component coupled to the control device, wherein the power connection component is configured to be removably coupled to a power source external to the article of manufacture to provide power to the control device and the speaker device.

9. The article of manufacture of claim 1, wherein the speaker device is a waterproof speaker device.

10. The article of manufacture of claim 1, wherein the control device comprises a power shut off component configured to automatically shut off power from the at least one battery, and wherein the power shut off component is further configured to automatically shut off power from the at least one battery after a defined amount of time that the at least one battery has provided power to the control device or the speaker device.

11. The article of manufacture of claim 1, wherein the article of manufacture comprises a cup, a basket or a waste container.

12. The article of manufacture of claim 1, further comprising a second speaker device, wherein the second speaker device is located in an inner region of the double walled receptacle and is configured to emit the sound.

13. The article of manufacture of claim 1,
wherein the at least one battery is located in the removable portion of the receptacle; and
further comprising a seal located around a periphery of an interior region of the removable portion.

14. The article of manufacture of claim 12, wherein the removable portion further comprises the second speaker device.

15. The article of manufacture of claim 13, further comprising:
volume level circuitry configured to control a volume of the sound emitted from the double walled receptacle; and
a volume control element electrically coupled to the volume level circuitry and controllable by a user of the double walled receptacle.

16. A cup for holding a fluid, comprising:
a removable portion, wherein the removable portion affixes to a bottom of the cup, wherein the removable portion comprises:
one or more speaker devices configured to emit sound;
at least one illuminating device; and
a power source coupled to one or more electrical connections respectively coupled to the one or more speaker devices to provide power to the one or more speaker devices, wherein the power source is configured to cause the one or more of the speaker devices to emit sound indicative of a song or a ringtone from the cup, and to cause illumination of the at least one illuminating device corresponding with a portion of the song or ringtone.

* * * * *